W. C. TROMPETER.
AGRICULTURAL IMPLEMENT.
APPLICATION FILED AUG. 2, 1915.
1,181,941.
Patented May 2, 1916.
2 SHEETS—SHEET 1.
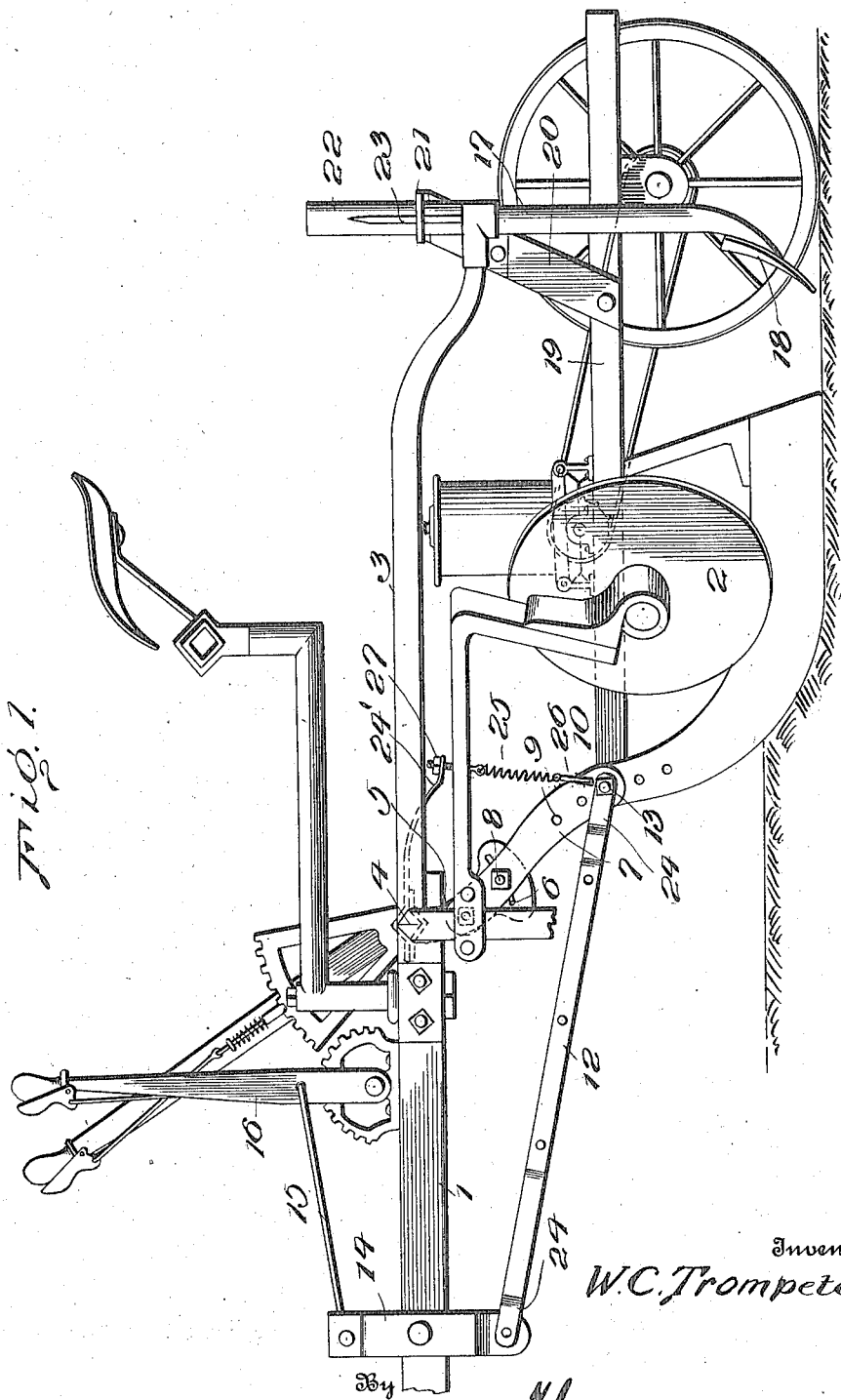
Inventor
W. C. Trompeter
By
          Attorneys

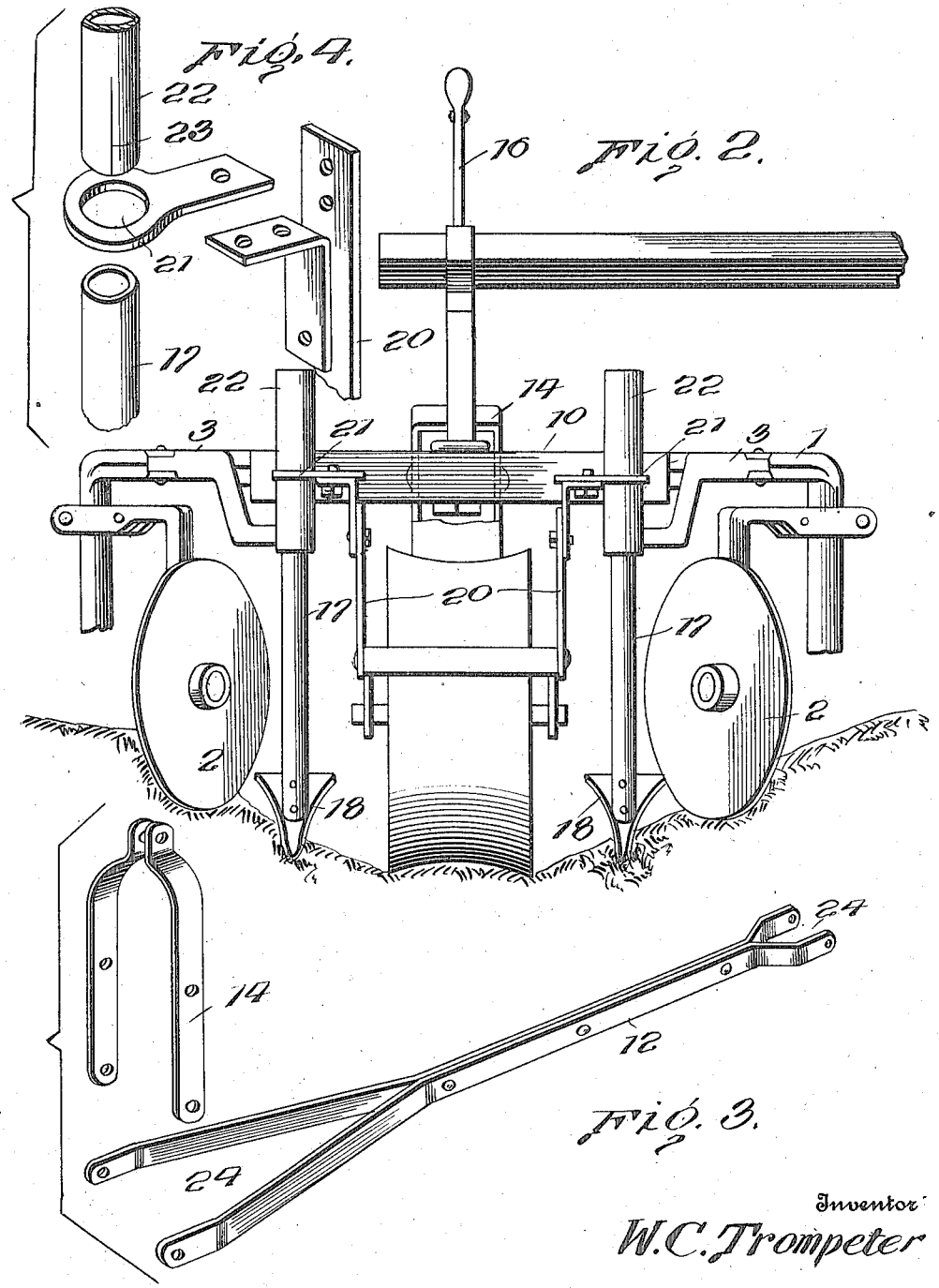

UNITED STATES PATENT OFFICE.

WILLIAM C. TROMPETER, OF EDGEMONT, SOUTH DAKOTA.

AGRICULTURAL IMPLEMENT.

1,181,941. Specification of Letters Patent. Patented May 2, 1916.

Original application filed February 4, 1915, Serial No. 6,098. Divided and this application filed August 2, 1915. Serial No. 43,168.

*To all whom it may concern:*

Be it known that I, WILLIAM C. TROMPETER, a citizen of the United States, residing at Edgemont, in the county of Fall River and State of South Dakota, have invented certain new and useful Improvements in Agricultural Implements, of which the following is a specification.

This application is a division of an application filed by me February 4, 1915, Serial No. 6,098.

The objects of the invention are to provide simple and efficient means whereby a planter may be coupled to a lister cultivator and readily adjusted to run at any desired depth in the bottom of the furrow, and to provide means for permitting vertical movement of the planter while preventing lateral movement thereof.

With these objects in view, the invention consists in certain novel features which are illustrated in the accompanying drawings, and which will be hereinafter first fully described and then more particularly pointed out in the claims following the description.

In the drawings: Figure 1 is a side elevation of a portion of a cultivator and a planter having my improvements applied thereto; Fig. 2 is a rear elevation of the same; Fig. 3 is a detail perspective view of the draw-bar; and Fig. 4 is a detail perspective view of the device for controlling the oscillation of the planter.

In the practice of my invention, I plow the field in the fall or early in the spring by means of a lister plow having a sub-soil attachment, the object of the early plowing being to permit moisture to be caught in the trenches. The plowed field is then permitted to remain idle until the proper time for planting, at which time the soil will have acquired some heat so that the germination of the seeds will be quickly started after they are planted. When the soil has acquired sufficient moisture and has absorbed sufficient heat, I drive over the field in the previously formed furrows or trenches a lister cultivator, indicated at 1 in the accompanying drawings. This lister cultivator may be of any desired type and is preferably one employing cultivator disks 2 and having rearwardly extending beams 3. To a cross bar 4 of the cultivator, I attach a hanger 5 having an arcuate slot 6 in its lower portion, and to said hanger I secure the links or side bars 7 which carry a bolt 8 playing in the said slot 6. The upper ends of these links or side bars are pivotally attached to the hanger 5 at a point forming the center of the arcuate slot 6, and the lower ends of said links or side bars are secured to the front end of the planter, indicated generally at 10. The lower ends of the links are provided with a vertical series of openings 9 so that the links may be secured at any desired point vertically of the planter and the depth at which the planter shoe will run in the bottom of the trench thereby regulated.

A draw bar 12 is attached to the planter, either by the same bolt 13 which secures the links 7 thereto or by a separate bolt inserted through one of the lower openings in the planter shoe, and the front end of said draw bar is pivotally attached to the lower end of a hanger or lever 14 which carries the usual whiffletree or other draft device. This hanger has its upper end connected by a link 15 with an adjusting lever 16 mounted upon the cultivator frame, the function of the said lever 16 being to lift the planter and cultivator and hold the planter in any adjusted position.

The rear ends of the side bars or beams 3 of the cultivator carry standards 17 which are equipped with cultivator shovels 18 at their lower ends in the usual manner. To the side bars or frame 19 of the planter I secure short standards or bars 20 which are equipped with eyes 21 at their upper extremities to loosely engage over the standards 17 whereby the said eyes may slide vertically upon the cultivator standards but will have no lateral movement with respect thereto. The standards or bars 20 may be, and preferably will be, constructed of adjustably connected sections so as to accommodate the device to different sizes and forms of cultivators and planters.

It will be readily understood that, if the planter or the covering wheel of the same should strike a large clod or other obstruction, vertical movement thereof will be permitted without causing the same to become disconnected from the cultivator, and to permit an extensive range of such vertical movement, I provide a series of extension members 22 consisting of sleeves slightly less in diameter than the cultivator standards and split at their lower ends, as shown at 23, whereby the said lower ends may be expanded and forced over the upper ends of the standards and be held firmly thereon by the frictional engagement. The eye 21 will be large enough to ride easily over the lower end or joint of the extension sleeve, and a second sleeve may be fitted in the same manner upon the first sleeve, if so desired. Inasmuch as the keeper bars form a flexible or loose connection between the cultivator standards and the planter frame, the planter will be kept alined with the trench while it is used so that the seed will be planted in a true line.

The ends of the draw-bar 12 are formed into forks 24 which are adapted to embrace the front end of the planter shoe and the hanger or lever 14 respectively and thereby prevent twisting of the draw-bar or of the members to which it is connected. The provision of this draw-bar effects an application of the draft directly to the planter so as to relieve the strain upon the cultivator and also cause the planter to travel more easily upon the ground. It also aids in lifting the shoe of the planter to secure ample clearance.

An arm 24' projects rearwardly from the bar 4 and a spring 25 is suspended from the rear end of this arm, a rod 26 connecting the lower end of the spring with the planter and a thumb screw 27 at the upper end thereof serving to regulate the tension of the same. When the lever 16 is released and swung forward, the spring lifts the planter and it is distended when the planter is lowered to its work. When the lever 16 is swung forward, as just stated, the draw bar 12 pushes against the links 7 and the front end of the planter so that the links and the planter move slightly upward and backward so that the front end of the planter is raised and its clearance increased. The described movement of the several parts also causes the wheels of the cultivator to move backward, thereby rocking the bar 4 and causing the beam 3 to swing upwardly at its rear end and engage under the eye 21 so as to lift the rear end of the planter.

The mechanism employed by me is obviously simple in its construction and may be produced and applied to any cultivator and planter at a low cost. By the use of my improved agricultural machine in the manner previously stated, the seed will germinate quickly and all weeds which may have started at the time of planting will be destroyed. The planter may be positively maintained in alinement with the cultivator so that the seed will be deposited in the soil loosened by the sub-soiler in the bottom of the furrow and covered by the presser wheel of the planter. Should the planter strike a large clod or other obstruction, it may ride readily over the same inasmuch as the eyes 21 may move easily and freely over the standards 17 but will be prevented from dropping by their contact with the upper surface of the beams 3. When the apparatus has reached the end of a furrow, or for any other reason it is desired to raise the mechanism from the ground, the lever 16 is manipulated in the usual manner. It will be noted that the rear ends of the beams 3 lie normally out of contact with the eyes 21 so that there is a lost motion connection between the cultivator and the planter permitting the cultivator to be raised about three inches before lifting the planter, and, consequently, reducing the initial strain on the lifting lever. The adjusting lever may, therefore, be easily manipulated and the depth of the planting readily regulated without applying a bending or breaking strain to any of the parts.

Having thus described the invention, what is claimed as new is:—

1. The combination of a cultivator, a hanger depending therefrom, a planter, a connection between the planter and said hanger, a draft device pivoted upon the cultivator and extending above and below the same, a draw-bar having its ends pivoted to the said planter and lower end of said draft device respectively, a lever fulcrumed on the planter, and a connection between the lever and the upper end of the draft device.

2. The combination of a cultivator having standards at its rear end carrying cultivator shovels, a planter coupled to the cultivator, keeper bars secured to the planter frame and engaging over said cultivator standards to move vertically thereon, and tubular extensions adapted to frictionally engage over the said cultivator standards.

In testimony whereof I affix my signature.

WILLIAM C. TROMPETER. [L. S.]